United States Patent
Matsumiya (10) Patent No.: US 7,255,369 B2
(45) Date of Patent: Aug. 14, 2007

(54) SHOCK ABSORPTION TYPE STEERING COLUMN DEVICE

(75) Inventor: Takeshi Matsumiya, Gunma-ken (JP)

(73) Assignee: NSK Ltd., Tokyo (JP)

( * ) Notice: Subject to any disclaimer, the term of this patent is extended or adjusted under 35 U.S.C. 154(b) by 242 days.

(21) Appl. No.: 10/497,459

(22) PCT Filed: Dec. 3, 2002

(86) PCT No.: PCT/JP02/12653

§ 371 (c)(1),
(2), (4) Date: Jun. 2, 2004

(87) PCT Pub. No.: WO03/047945

PCT Pub. Date: Jun. 12, 2003

(65) Prior Publication Data

US 2005/0082811 A1    Apr. 21, 2005

(30) Foreign Application Priority Data

Dec. 6, 2001  (JP) ............................ 2001-373020

(51) Int. Cl.
B62D 1/16 (2006.01)
B62D 1/18 (2006.01)

(52) U.S. Cl. ..................... 280/777; 188/376

(58) Field of Classification Search .............. 188/371, 188/374, 376, 377; 280/777, 775; 74/492, 74/493

See application file for complete search history.

(56) References Cited

U.S. PATENT DOCUMENTS 5,085,467 A * 2/1992 Converse ................... 280/777
5,090,755 A * 2/1992 Garnweidner ............... 293/133
5,403,113 A * 4/1995 Gertz et al. ................... 404/6
5,829,310 A * 11/1998 DePaolis ..................... 74/492
7,143,877 B2 * 12/2006 Dusserre-Telmon et al. ..... 188/376

FOREIGN PATENT DOCUMENTS

| FR | 2 742 718 | 6/1997 |
|---|---|---|
| JP | 48-10737 | 2/1973 |
| JP | UM 48-37937 | 11/1973 |
| JP | UM 49-85726 | 7/1974 |
| JP | UM 4-26174 | 3/1992 |
| JP | UM 5-68776 | 9/1993 |
| JP | 7-17411 | 1/1995 |

* cited by examiner

Primary Examiner—Paul N. Dickson
Assistant Examiner—Joseph Rocca
(74) Attorney, Agent, or Firm—Miles & Stockbridge P.C.

(57) ABSTRACT

An impact energy absorbing member in which a plurality of impact absorbing plates are arranged with predetermined intervals along a direction in which a collapse stroke progresses is provided on either one of a vehicle side bracket or a column side bracket slidably fitted to the vehicle side bracket. On the other bracket, there is provided a breaking member for sequentially breaking said plurality of impact absorbing plates as the collapse stroke progresses. With this structure, the impact energy absorbing member is sequentially broken by the breaking member as the collapse stroke progresses upon secondary collision, so that impact energy is absorbed.

7 Claims, 8 Drawing Sheets

BEFORE RIPPING

FIG. 7B   PRIOR ART

AFTER RIPPING

EA OPERATING LENGTH

FIG. 8A

BEFORE EA

FIG. 8B

AFTER EA BY 1ST ROW

FIG. 8C

AFTER EA BY 2ND ROW

FIG. 8D

AFTER EA BY 3RD ROW

← EA OPERATING LENGTH →

SHOCK ABSORPTION TYPE STEERING COLUMN DEVICE

BACKGROUND OF THE INVENTION

1. Field of the Invention

The present invention relates to an impact absorbing type steering column apparatus for a vehicle in which the impact energy absorption amount can be minutely controlled in the course of a collapse stroke upon secondary collision.

2. Background Art

When a vehicle collides with a building structure or the like, the driver sometimes suffers secondary collision with the steering wheel due to inertia. In order to protect drivers from such secondary collision, it has become a common practice to use an impact absorbing type steering column.

The impact absorbing type steering column apparatus has such a structure that when the driver suffers secondary collision and the impact energy acts on the steering column in the frontward direction of the vehicle, the steering column collapses to be detached from the vehicle body and moves forward (in a stroke), so that the impact energy is absorbed in the course of the collapse stroke.

For example, in a ripping type impact absorbing mechanism disclosed in Japanese Utility Model Application Laid-Open No. 5-68776, the central portion of an energy absorbing member in the form of a strip-shaped steel plate is fixed to a bracket on the vehicle body and both the end portions of the steel plate are bent in a U-shape and fixed to the steering column, so that when the steering column moves in the frontward direction of the vehicle, the energy absorbing member is deformed to be bent and ripped.

On the other hand, there is a drawing type impact energy absorbing mechanism in which an end of a metal wire is fixed to a bracket on the steering column and the wire is wound around a tilt bolt on the vehicle body and extended toward the front side of the vehicle. Thus, when the steering column moves in the frontward direction of the vehicle, the wire is drawn and deformed by the tilt bolt.

However, the above-described impact absorbing type steering column apparatuses for a vehicle are designed in such a way that substantially constant impact energy is absorbed as the collapse stroke progresses. Therefore, it is not possible to control the impact energy absorption amount in the course of the collapse stroke or in accordance with the type of the vehicle.

SUMMARY OF THE INVENTION

The present invention has been made in view of the above-described problem. An object of the present invention is to provide an impact absorbing type steering column apparatus for a vehicle in which the impact energy absorption amount can be minutely controlled in the course of a collapse stroke upon secondary collision.

In order to attain the above object, according to the present invention, there is provided an impact absorbing type steering column apparatus for a vehicle that absorbs impact energy upon driver's secondary collision after collision of a vehicle, comprising an impact energy absorbing member in which a plurality of impact absorbing plates are arranged with predetermined intervals along a direction in which a collapse stroke progresses provided on either one of a vehicle side bracket or a column side bracket slidably fitted to the vehicle side bracket, and a breaking member for sequentially breaking the plurality of impact absorbing plates as the collapse stroke progresses provided on the other of said brackets.

In the impact absorbing type steering column apparatus for a vehicle according to the present invention, it is preferable that the impact energy absorbing member be produced by forming an extrudate utilizing an extrusion molding process and then cutting the extrudate into a predetermined width, to be provided with a plurality of impact absorbing plates arranged with predetermined intervals, each having substantially the same cross sectional shape and size in a direction substantially perpendicular to the direction in which the collapse stroke progresses.

According to the present invention, an impact energy absorbing member in which a plurality of impact energy absorbing members are arranged with predetermined intervals along the direction in which the collapse stroke progresses is provided on one of a vehicle side bracket or a column side bracket slidably fitted to the vehicle side bracket and a breaking member for sequentially breaking the plurality of impact absorbing members as the collapse stroke progresses is provided on the other of the brackets. Thus, as the collapse stroke upon secondary collision progresses, the plurality of impact absorbing members arranged with predetermined intervals are broken by the breaking member so that impact energy is absorbed.

In addition, the amount of impact energy absorption in the course of the collapse stroke upon secondary collision can be minutely controlled by appropriately adjusting the interval (or pitch), the thickness or the width of the impact absorbing plates. In addition, the amount of impact energy absorption can also be controlled in accordance with the type of the vehicle.

Preferably, the impact energy absorbing member is produced by forming an extrudate utilizing an extrusion molding process and then cutting the extrudate into a predetermined width, to be provided with a plurality of impact absorbing plates arranged with predetermined intervals each having substantially the same cross sectional shape and size in a direction substantially perpendicular to the direction in which the collapse stroke progresses.

In that case, the impact energy absorbing member can be mounted on the vehicle side bracket or the column side bracket only by inserting the impact energy absorbing member into either one of the brackets. Therefore, the mounting operation can be made simple. In addition, in the case that the impact energy absorbing member is press fitted into either one of the brackets, play in assembly can also be eliminated, since the multiple impact absorbing members elastically press circumferential members.

BRIEF DESCRIPTION OF THE DRAWINGS

FIGS. 4A and 4B are side views showing the impact energy absorbing mechanism, where FIG. 4A shows a state before energy absorption and FIG. 4B shows a state after energy absorption.

FIGS. 7A and 7B are plan view showing a ripping type impact energy absorbing mechanism according to a prior art, where FIG. 7A shows a state before ripping and FIG. 7B shows a state after ripping.

DETAILED DESCRIPTION OF THE PREFERRED EMBODIMENT

In the following, an impact absorbing type steering column apparatus according to an embodiment of the present invention will be described with reference to the accompanying drawings.

Figure 1A:
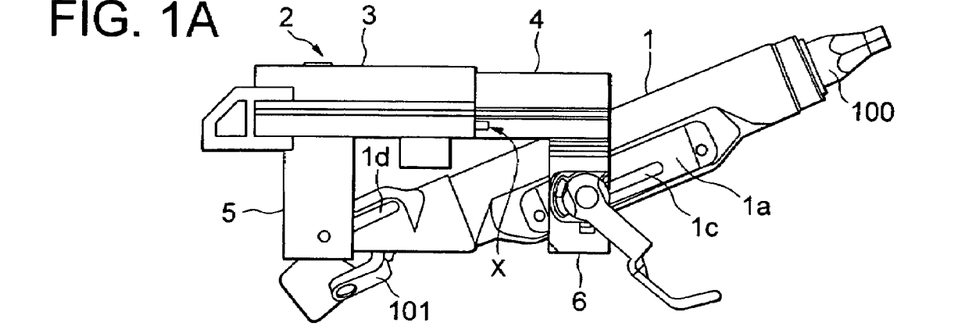
FIG. 1A is a side view showing an impact absorbing type steering column apparatus for a vehicle according to an embodiment of the present invention.
Figure 1B:
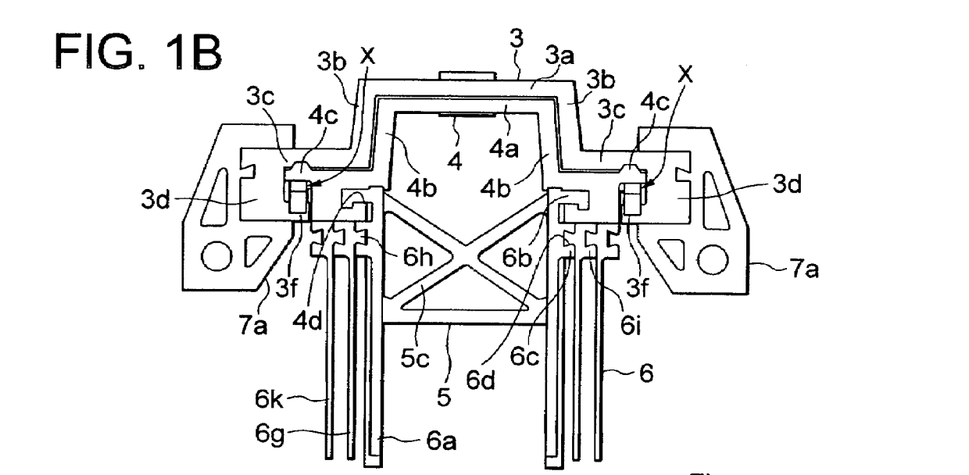
FIG. 1B is a front view showing the impact absorbing type steering column apparatus for a vehicle shown in FIG. 1A.
Figure 1C:
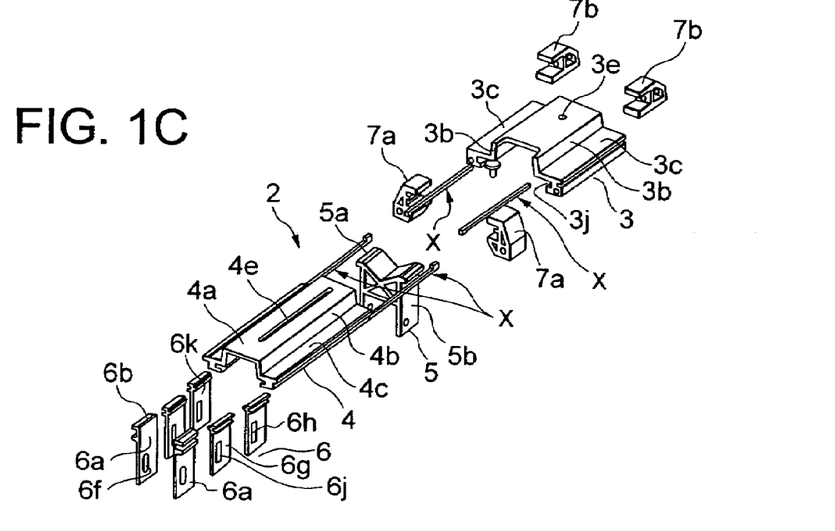
FIG. 1C is an exploded perspective view showing the impact absorbing type steering column apparatus for a vehicle shown in FIG. 1A.

FIG. 1A is a side view showing the impact absorbing type steering column apparatus according to the embodiment of the present invention. FIG. 1B is a front view of the impact absorbing type steering column apparatus shown in FIG. 1A. FIG. 1C is an exploded perspective view showing the impact absorbing type steering column apparatus shown in FIG. 1A.

The steering column 1 is secured to the vehicle body by means of a supporting bracket 2. The steering column 1 is adapted in such a way that its tilt position and telescopic position can be adjusted.

A steering wheel (not shown) is fixed to the upper end (or the rear side end, in terms of the orientation in the vehicle) of a steering shaft 100 rotatably supported by the steering column 1. The lower end (or the front end, in terms of the orientation in the vehicle) of the steering shaft 100 is connected to a steering gear mechanism (not shown) by means of a universal joint 101.

The supporting bracket 2 is designed to be composed of a plurality of divisional members in advance so that the supporting bracket 2 can be assembled by mating and press fitting the plurality of members having a lateral cross section that does not change in size and shape all along their length along the direction in which the steering column extends. The supporting bracket 2 is mainly composed of divisional members including a first wing member 3 extending in the width direction of the vehicle and having a lateral cross section that does not change in size and shape all along its length along the longitudinal direction of the steering column, a second wing member 4 that is also extending in the width direction of the vehicle, fitted in the first wing member 3 and having a lateral cross section that does not change in size and shape all along its length along the longitudinal direction of the steering column, a supporting member 5 that is fitted and fixed in the first wing member 3 at the vehicle front side and having a lateral cross section that does not change in size and shape all along its length along the longitudinal direction of the steering column, a plurality of support plate members 6 each of which is fitted and fixed in the second wing member 4, provided with a longitudinal groove for allowing tilt adjustment and having a lateral cross section that does not change in size and shape all along its length along the longitudinal direction of the steering column, and mount members 7a and 7b that are fitted to both sides of the first wing member 3. The first wing member 3, the second wing member 4, the support member 5, the plurality of supporting plate members 6 and the mount members 7a and 7b have complementally formed fitting and engaging portions for allowing fitting of adjacent members as shown in FIG. 1B, so that they are fitted and assembled by press fitting.

The first wing member 3 has a flat top plate portion 3a to be secured to a strength member on the vehicle body, side plate portions 3b, 3b extending substantially vertically on both outer sides of the top plate portion 3a and laterally extending portions 3c, 3c substantially horizontally extending from both the side plate portions 3b, 3b, all of which are integrally formed. On both outer end portions of the first wing member 3, the mount members 7a and 7b are fitted and fixed. As per the above, the first wing member 3, the front supporting member 5 and the mount members 7a and 7b constitute a bracket on the vehicle body side.

On the inner side at the lower end of both the side plate portions 3b, 3b of the first wing member 3, there is formed longitudinally extending dovetail mortises 3j for engagement, to which projected portions 5a, 5a formed on both sides of the upper end of the first front supporting member 5 are fitted and secured at the front side with respect to the vehicle. The first front supporting member 5 has downwardly extending side plate portions 5b, 5b and a brace portion 5c for holding the side plate portions apart from each other. The first front supporting member 5 is joined with the first wing member 3 to constitute a lower bracket on the vehicle body side.

The second wing member 4 has a shape complementary fitting with the shape of the first wing member 3. The second wing member 4 has, similar to the first wing portion 3, a flat top portion 4a, side plate portions 4b, 4b extending substantially vertically on both outer sides of the top plate portion 4a and laterally extending portions 4c, 4c substantially horizontally extending from both the side plate portions 4b, 4b, all of which are integrally formed.

On the inner side at the lower end of both the side plate portions 4b, 4b of the second wing member 4, there is formed longitudinally extending dovetail mortises 4d, 4d for engagement, to which upper projected portions 6b of the upper end of first rear supporting members 6a are fitted and secured at the rear side with respect to the vehicle. The first rear supporting members 6a are downwardly extending plate-like members that are in contact with the lower surface of both the side plate members 4b, 4b of the second wing member 4. Each of the first rear supporting member 6a is provided with an outward projecting portion 6c, in which a longitudinally extending dovetail mortise 6d is formed. Outside the first rear supporting members 6a, second rear supporting members 6g are secured by means of projecting portions 6h fitted to the dovetail mortises of the first rear supporting members 6a. The second rear supporting member 6g has a projecting portion 6i on the outer side at the upper end thereof, in which a longitudinally extending dovetail mortise is formed. Outside the second supporting members 6g, third rear supporting members 6k having the shape same as the second rear supporting members 6g are fitted and secured in a manner similar to the second rear supporting members 6g. The first to third rear supporting members 6a, 6g and 6k constitute the aforementioned supporting plate members 6. In addition, the second wing member 4, the first, second and third rear supporting members 6a, 6b and 6c constitute a bracket on the column side.

As shown in FIG. 1C, on the top plate portion 3a of the first wing member 3, there is provided a circular hole 3e. On the other hand, on the top plate portion 4a of the second wing member 4 that overlaps the top plate portion 3a of the first wing member 3, there is provided a long hole 4e opposed to the circular hole 3e. The top plate portion 3a of the first wing member 3 and the top plate portion 4a of the second wing member 4 are attached and secured to the strength member of the vehicle by suitable securing means such as a bolt (not shown) via these two holes. In this structure, the column side bracket including the second wing member 4 is adapted in such a way that when an impact load exceeding a predetermined value acts on the column side bracket, the column side bracket can move relative to the vehicle side bracket including the first wing member 3.

The lower end of the outwardly projecting portions 3d, 3d on the outer ends of the laterally extending portions 3c, 3c of the first wing member 3 are integrally provided with inwardly projecting portions 3f, 3f. On the other hand, the outer end portions of the laterally extending portions 4c, 4c of the second wing member 4 have lower surfaces opposed to the upper surfaces of the inwardly projecting portions 3f, 3f of the first wing member 3.

In a space thus formed between the vehicle side bracket and the column side bracket of the supporting bracket 2, there is provided an impact energy absorbing mechanism X for absorbing impact energy acting on the steering column 1 upon secondary collision. The impact energy absorbing mechanism X will be described in detail later with reference to FIG. 2A and succeeding drawings.

The steering column 1 is rotatably supported by the front supporting member 5 at its lower end. The side wall portion 1a integrally provided on the lower portion of the steering column 1 is also secured to the rear supporting members 6a, 6g and 6k that constitute the column side bracket by means of a fastening mechanism having a well-known structure. Long holes 1c and 1d extending in the column axis direction formed on the lower portion of the column are provided for adjusting the telescopic position of the column (see FIG. 1A), while vertically extending long holes 6f, 6j and 6h formed on the supporting members 6a, 6g and 6k of the column side bracket are provided for adjusting the tilt position of the column (see FIG. 1C).

In the following, the impact energy absorbing mechanism provided between the vehicle side bracket and the column side bracket will be described in detail.

Figure 2A:
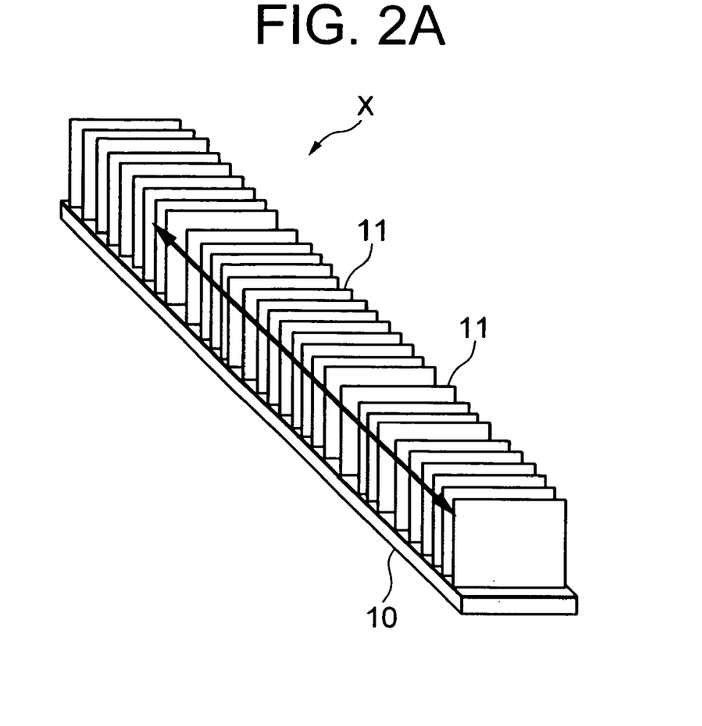
FIGS. 2A and 2B schematically show an impact energy absorbing mechanism for absorbing impact energy upon secondary collision.
Figure 2B:
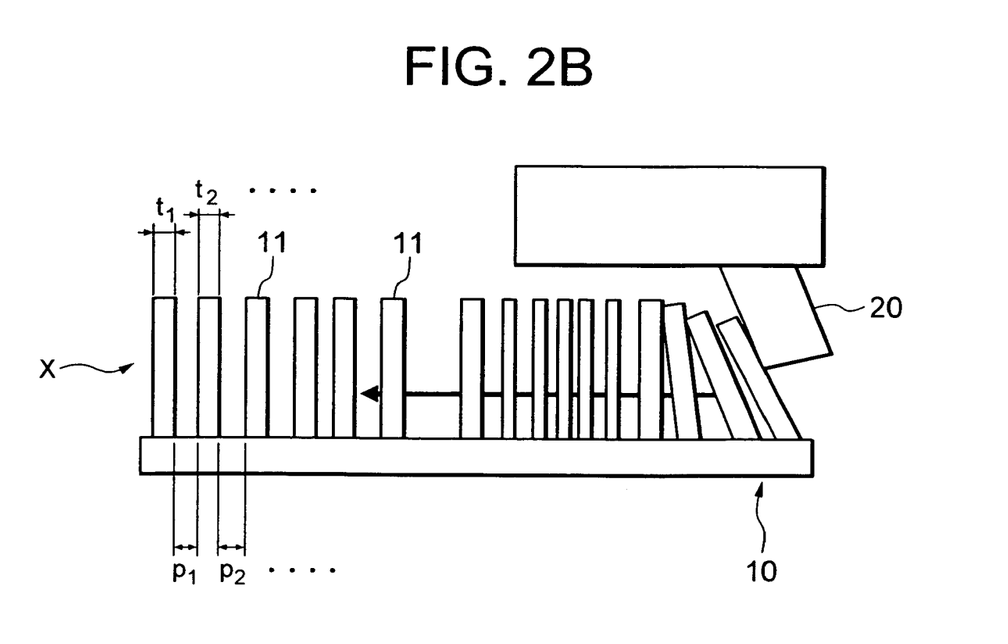

FIGS. 2A and 2B are schematic diagrams showing the impact energy absorbing mechanism for absorbing impact energy upon secondary collision. FIG. 2A shows a state before impact energy absorption and FIG. 2B shows a state during impact energy absorption.

The impact energy absorbing mechanism X is composed of an impact energy absorbing member 10 in which a plurality of impact absorbing plates 11 are arranged with predetermined intervals along the direction in which steering column 1 moves with the column side bracket upon secondary collision and a breaking member 20 for sequentially breaking the plurality of impact absorbing plates 11 as the steering column 1 moves to absorb impact energy. In connection with this, the movement of the steering column with the column side bracket upon secondary collision, until it is stopped, during which impact energy is absorbed by the impact absorbing member is called a collapse stroke.

The impact energy absorbing member 10 including the multiple impact absorbing plates 11 is provided, for example, on the inwardly projecting portions 3f, 3f of the first wing member 3 that constitutes the vehicle side bracket, and the breaking member 20 is fixed to the laterally extending portions 4c, 4c of the second wing member 4 that constitutes the column side bracket, vice versa.

With these structures, as the collapse stroke (in which the column side bracket moves frontward (with respect to the vehicle) upon a second collision together with the steering column) progresses, the multiple impact absorbing plates 11 arranged with predetermined intervals are broken by the breaking member 20, so that impact energy is absorbed.

The amount of impact energy absorption in the course of the collapse stroke upon secondary collision can be minutely controlled by appropriately adjusting the interval (or pitches $P_1, P_2 \ldots$), the thickness ($t_1, t_2 \ldots$) or the width of the impact absorbing plates 11. In addition, the amount of impact energy absorption can also be controlled in accordance with the type of the vehicle.

Figure 3A:
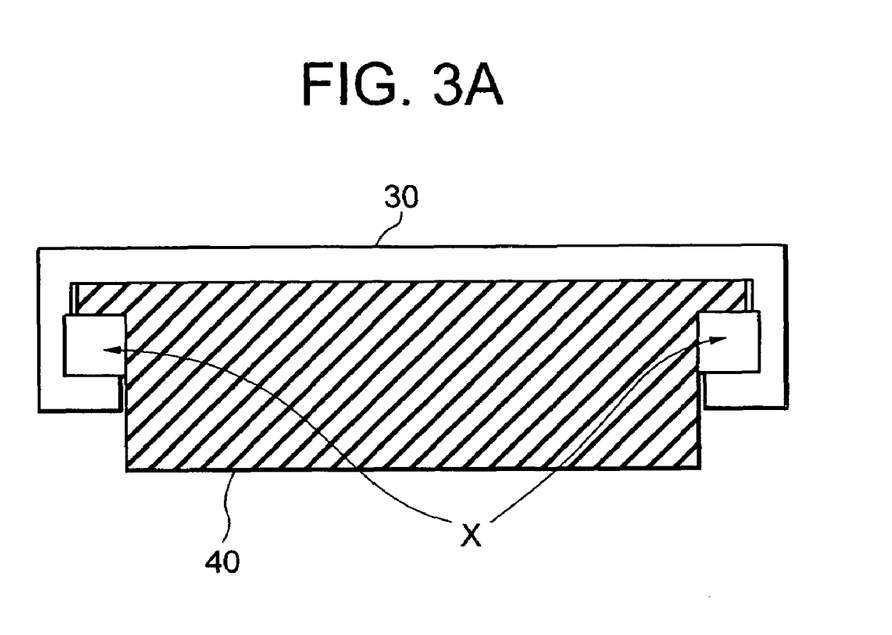
FIGS. 3A and 3B are a front view and a side view of the impact energy absorbing mechanism respectively.
Figure 3B:
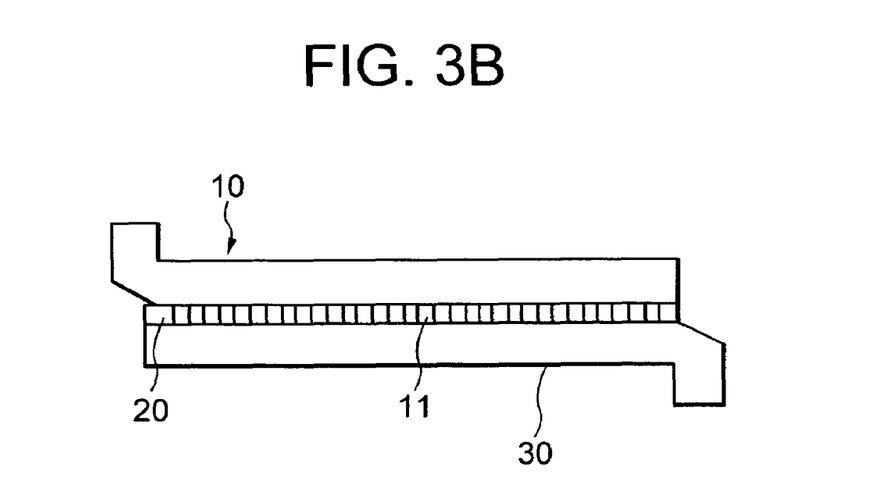
Figure 4A:
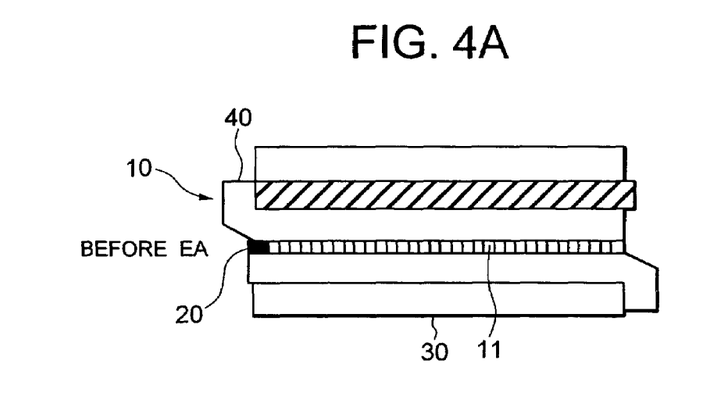
Figure 4B:
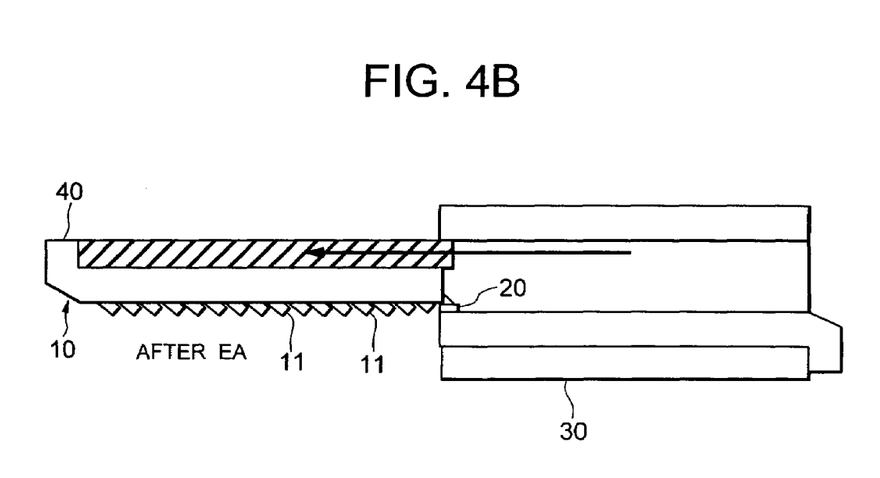

FIG. 3A and FIG. 3B are a front view and a side view showing the impact energy absorbing mechanism respectively. FIGS. 4A and 4B are side views of the impact energy absorbing mechanism, where FIG. 4A shows a state before impact energy absorption and FIG. 4B shows a state after impact energy absorption.

In the structure shown in FIGS. 3A and 3B and FIGS. 4A and 4B, the impact energy absorbing member 10 in which the multiple impact absorbing plates 11 are arranged along the direction in which the collapse stroke progresses is provided on the column side bracket 40 which is schematically illustrated, and the breaking member 20 for breaking the multiple impact absorbing plates 11 sequentially as the collapse stroke progresses is provided on the vehicle side bracket, which is schematically illustrated.

With the above structure, as the collapse stroke progresses, the multiple impact absorbing plates 11 arranged with predetermined intervals are broken by the breaking member 20, so that impact energy can be absorbed.

The impact energy absorbing member 10 is produced by molding an extrudate provided with a plurality of impact absorbing plates 11 arranged with predetermined intervals each having substantially the same cross sectional shape and size in a direction substantially perpendicular to the direction in which the collapse stroke progresses utilizing an extrusion molding process, and then cutting the extrudate into a predetermined width.

Consequently, the impact energy absorbing member 10 can be mounted on the vehicle side bracket 30 or the column side bracket 40 only by inserting the impact energy absorbing member 10 into either one of the brackets 30 or 40. Therefore, the mounting operation can be made simple. In addition, in the case that the impact energy absorbing member 10 is press fitted into either one of the brackets 30 or 40, play in assembly can also be eliminated, since the multiple impact absorbing members 11 will elastically press circumferential members.

Figure 5:
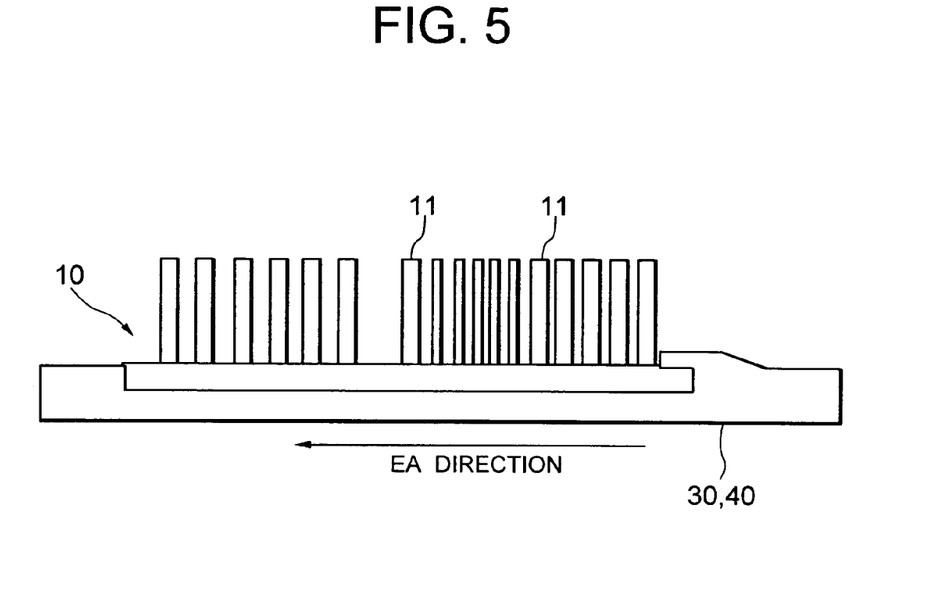
FIG. 5 is a side view showing the impact energy absorbing mechanism.

FIG. 5 is a side view of the impact energy absorbing mechanism.

In the structure shown in FIG. 5, the amount of impact energy absorption in the course of the collapse stroke upon secondary collision can be minutely controlled by appropriately adjusting the interval, the thickness or the width of the impact absorbing plates 11. In addition, the amount of impact energy absorption can also be controlled in accordance with the type of the vehicle.

The impact energy absorbing member 10 may be fitted in a groove formed in the bracket 30 or 40 as shown in FIG. 5.

FIGS. 6A, 6B, 6C and 6D are perspective views showing the impact energy absorbing mechanisms.

Figures 6A, 6B, 6C, 6D:
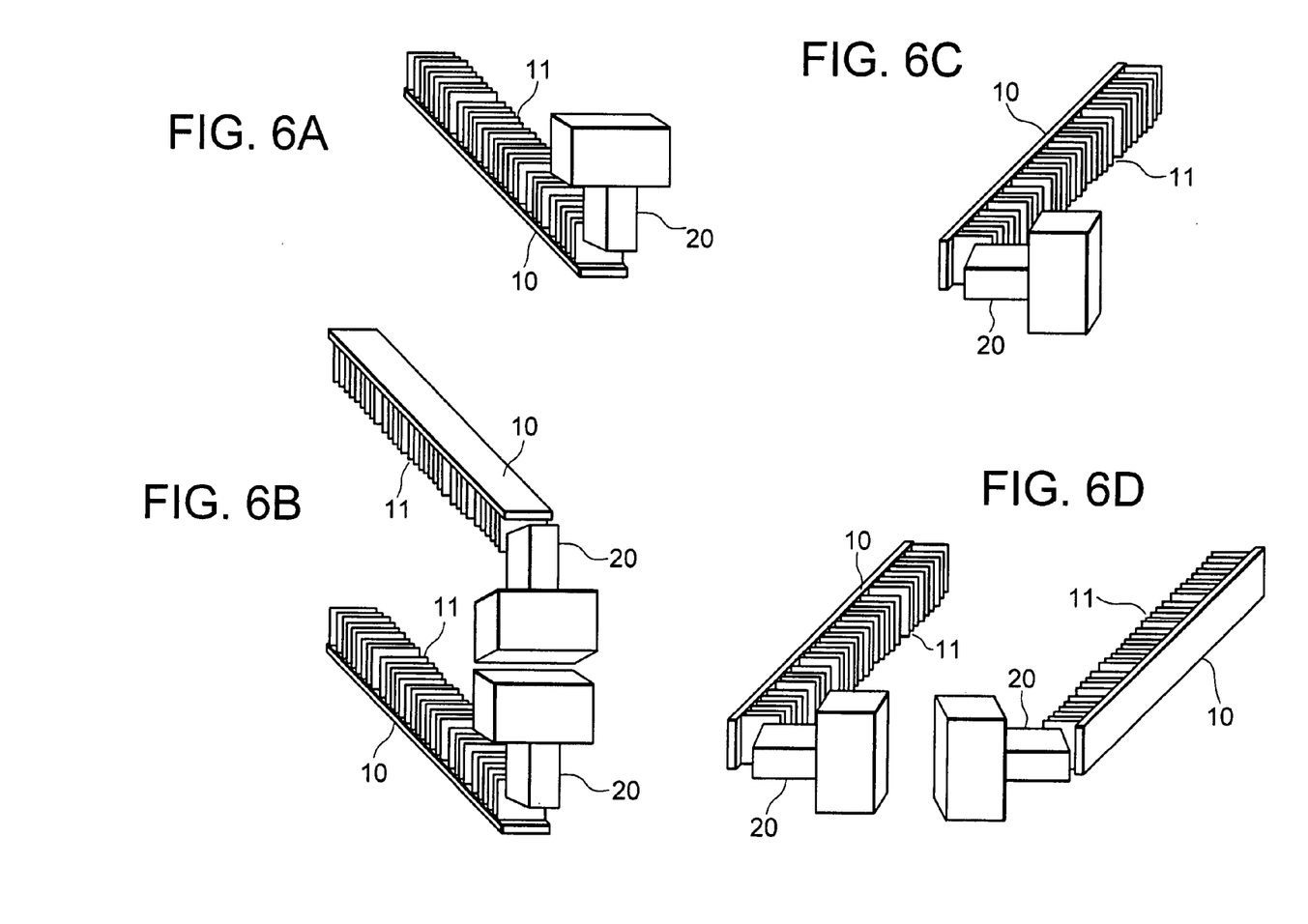
FIGS. 6A, 6B, 6C and 6D are perspective views showing impact energy absorbing mechanisms.

In the structure shown in FIG. 6A, the impact energy absorbing member 10 and the breaking member 20 are vertically arranged, and in the structure shown in FIG. 6B, two sets of the impact energy absorbing members 10 and the breaking members 20 are vertically arranged. In the structure shown in FIG. 6C, the impact energy absorbing member 10 and the breaking member 20 are horizontally arranged, and in the structure shown in FIG. 6D, two sets of the impact energy absorbing members 10 and the breaking members 20 are horizontally arranged.

Figure 7A:
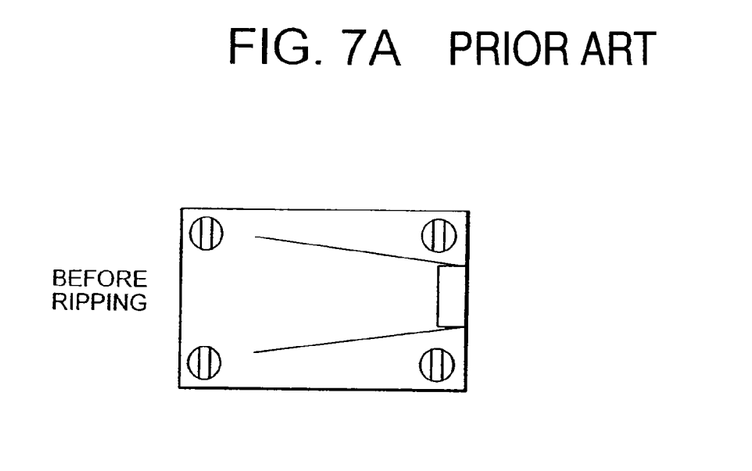
Figure 7B:
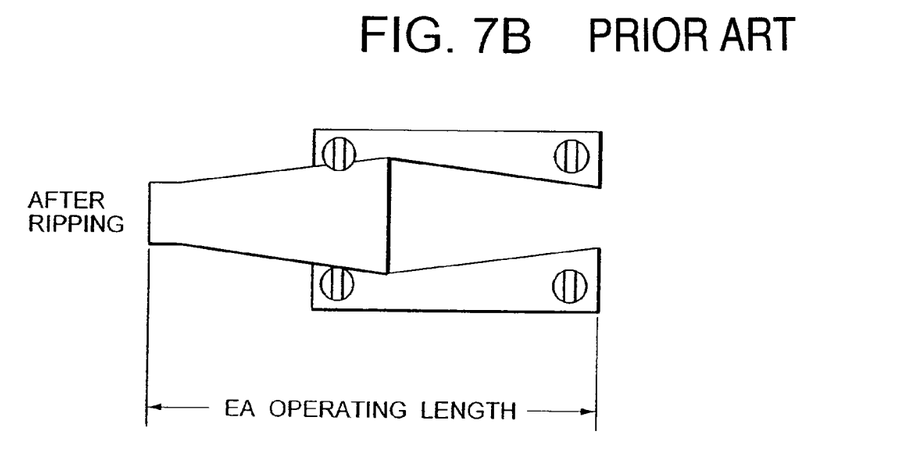
Figure 8A:
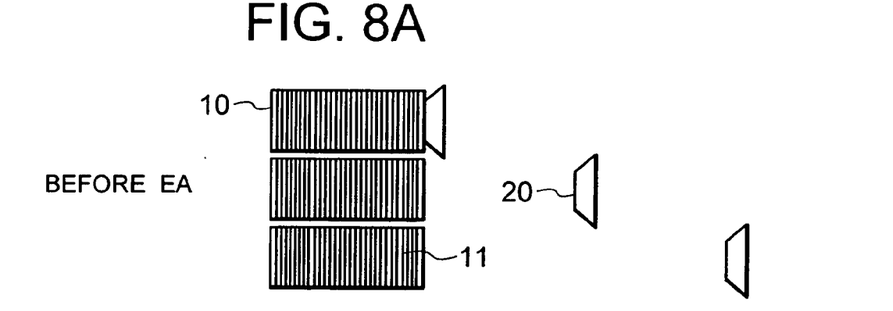
FIGS. 8A, 8B and 8C are plan views showing an impact energy absorbing mechanism provided with an impact absorbing plates arranged in multiple rows and breaking members according to the present embodiment, showing different energy absorption states respectively.
Figure 8B:
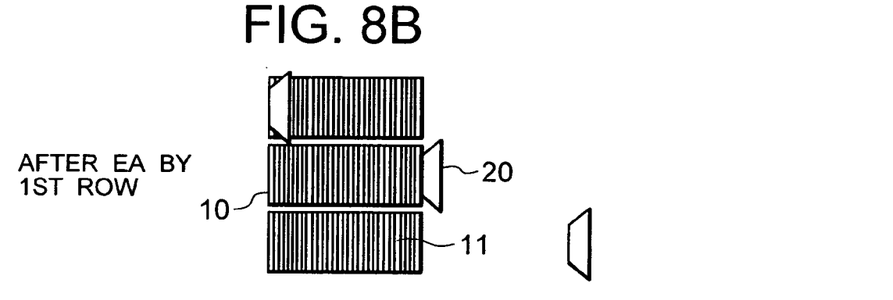
Figure 8C:
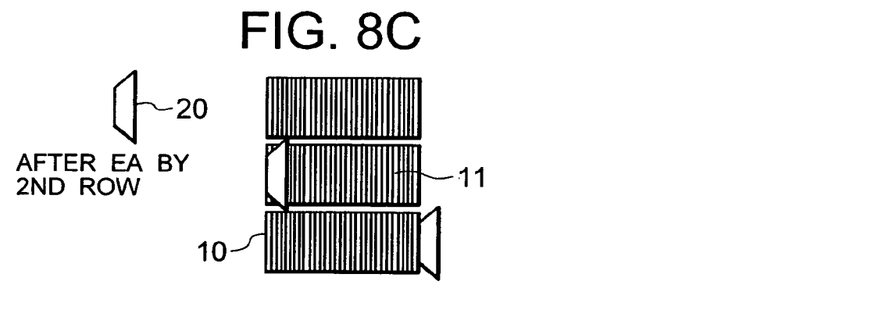
Figure 8D:
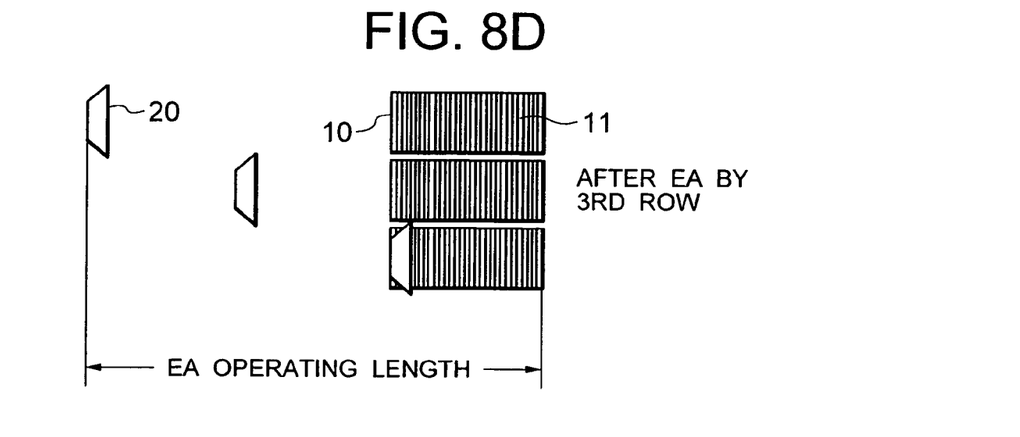

FIGS. 7A and 7B are plan views showing a ripping type impact energy absorbing mechanism according to a prior art, where FIG. 7A shows a state before ripping and FIG. 7B shows a state after ripping. FIGS. 8A to 8D are plan views showing the impact energy absorbing mechanism according to this embodiment, where FIG. 8A shows a state before impact absorption, FIG. 8B shows a state after completion of energy absorption by the first row of the energy absorbing members, FIG. 8C shows a state after completion of energy absorption by the second row, and FIG. 8D shows a state after completion of energy absorption by the third row.

The prior art structure shown in FIGS. 7A and 7B and the structure of the embodiment shown in FIGS. 8A to 8D have substantially the same "energy absorption operation length".

However, the structure of the embodiment shown in FIGS. 8A to 8D is provided with the impact energy absorbing members 10 having multiple impact absorbing plates 11 and the breaking members 20 arranged in three rows, and this structure practically has an impact energy absorbing stroke (length) about three times as large as the prior art structure shown in FIGS. 7A and 7B.

In other words, the "energy absorption operation length" of the structure of the embodiment shown in FIGS. 8A to 8D can be made one third of that of the prior art structure when the same impact energy is absorbed.

The present invention is not limited to the above-described embodiment, but it can be modified in various ways.

As per the above, according to the present invention, an impact energy absorbing member in which a plurality of impact energy absorbing members are arranged with predetermined intervals along the direction in which collapse stroke progresses is provided on one of a vehicle side bracket or a column side bracket slidably fitted to the vehicle side bracket and a breaking member for sequentially breaking the plurality of impact energy absorbing members as the collapse stroke progresses is provided on the other of the brackets. Thus, as the collapse stroke upon secondary collision progresses, the plurality of impact energy absorbing members arranged with predetermined intervals are broken by the breaking member so that impact energy is absorbed.

In addition, the amount of impact energy absorption in the course of the collapse stroke upon secondary collision can be minutely controlled by appropriately adjusting the interval (or pitch), the thickness or the width of the impact absorbing plates. In addition, the amount of impact energy absorption can also be controlled in accordance with the type of the vehicle.

Furthermore, the impact energy absorbing member is produced by forming an extrudate utilizing an extrusion molding process and then cutting the extrudate into a predetermined width to be provided with a plurality of impact absorbing plates arranged with predetermined intervals each having substantially the same cross sectional shape and size in a direction substantially perpendicular to the direction in which the collapse stroke progresses. Therefore, the impact energy absorbing member can be mounted on the vehicle side bracket or the column side bracket only by inserting the impact energy absorbing member into either one of the brackets. Therefore, the mounting operation can be made simple. In addition, in the case that the impact energy absorbing member is press fitted into either one of the brackets, play in assembly can also be eliminated, since the multiple impact absorbing members elastically press circumferential members.

What is claimed is:

1. An impact absorbing type steering column apparatus that absorbs impact energy upon driver's secondary collision after collision of a vehicle, comprising:
    a vehicle side bracket to be secured to a vehicle body;
    a column side bracket slidably fitted to the vehicle side bracket and holding a steering column in which a steering shaft attached with a steering wheel at a rear end thereof, is rotatably supported;
    an impact energy absorbing member provided on one of the vehicle side bracket and the column side bracket, the impact energy absorbing member being separate from said one of the vehicle side bracket and the column side bracket and including a plurality of impact absorbing plates arranged with predetermined intervals along a direction in which a collapse stroke progess, the plurality of impact absorbing plates having substantially the same cross sectional shape and size in a direction substantially perpendicular to the direction in which the collapse stroke progresses; and
    a breaking member provided on the other of said brackets and disposed for sequentially breaking said plurality of impact absorbing plates as the collapse stroke progress.

2. An impact absorbing type steering column apparatus according to claim 1, wherein at least one of the interval, thickness and width of said plurality of impact absorbing plates is adjusted to control collapse load characteristics upon secondary collision.

3. An impact absorbing type steering column apparatus according to claim 1, wherein said impact energy absorbing member is produced by forming an extrudate utilizing an extrusion molding process, and then cutting the extrudate into a predetermined width to be provided with a plurality of impact absorbing plates arranged with predetermined intervals.

4. An impact absorbing type steering column apparatus according to claim 2, wherein said impact energy absorbing member is produced by forming an extrudate utilizing an extrusion molding process, and then cutting the extrudate into a predetermined width to be provided with a plurality of impact absorbing plates arranged with predetermined intervals.

5. An impact absorbing type steering column apparatus according to claim 1, wherein said plurality of impact absorbing plates include plates of different thickness.

6. An impact absorbing type steering column apparatus that absorbs impact energy upon a driver's secondary collision after collision of a vehicle, comprising:
    a vehicle side bracket to be secured to a vehicle body;
    a column side bracket slidably fitted to the vehicle side bracket and holding a steering column in which a steering shaft is rotatably supported;
    an impact energy absorbing member separate from the vehicle side bracket and the column side bracket and mounted to one of the vehicle side bracket and the column side bracket, the impact energy absorbing member including a plurality of impact absorbing plates arranged at predetermined intervals along a direction in which a collapse stroke progresses; and an impact member provided on the other of the vehicle side bracket and the column side bracket and disposed for sequentially impacting and displacing the plurality of impact absorbing plates as the collapse stroke progresses, wherein the plurality of impact absorbing plates extend, in a direction substantially perpendicular to the direction in which the collapse stroke progresses, from a common base portion mounted to said one bracket.

7. An impact absorbing type steering column apparatus according to claim 6, wherein said plurality of impact absorbing plates include plates of different thickness.

* * * * *